(12) United States Patent  (10) Patent No.: US 8,516,647 B2
O'Connor  (45) Date of Patent: Aug. 27, 2013

(54) COLLAPSIBLE PIVOT BODY FOR A WINDSHIELD WIPER SYSTEM

(75) Inventor: James G. O'Connor, Oxford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 955 days.

(21) Appl. No.: 12/587,858

(22) Filed: Oct. 14, 2009

(65) Prior Publication Data

US 2011/0083296 A1  Apr. 14, 2011

(51) Int. Cl.
  *B60S 1/04* (2006.01)
  *B60S 1/06* (2006.01)
(52) U.S. Cl.
  USPC ...... 15/250.31; 15/250.3; 403/2; 403/DIG. 3; 384/295
(58) Field of Classification Search
  USPC ... 15/250.3, 250.31; 296/96.15; 403/DIG. 3, 403/2, 220, 224; 384/295
  See application file for complete search history.

(56) References Cited

U.S. PATENT DOCUMENTS

| | | | |
|---|---|---|---|
| 3,910,652 A | 10/1975 | Riester et al. | 308/26 |
| 6,216,309 B1 | 4/2001 | Goto et al. | 15/250.31 |
| 6,317,918 B1 | 11/2001 | Kagawa et al. | 15/250.31 |
| 6,347,427 B2 | 2/2002 | Kobayashi et al. | 15/250.31 |
| 6,505,376 B1 | 1/2003 | Kagawa | 15/250.31 |
| 6,532,616 B1 | 3/2003 | Eustache | 15/250.31 |
| 6,568,023 B2 | 5/2003 | Perin et al. | 15/250.3 |
| 6,718,592 B2 | 4/2004 | Ohashi et al. | 15/250.31 |
| 6,901,623 B2 | 6/2005 | Ohashi et al. | 15/250.31 |
| 2001/0011831 A1 | 8/2001 | Ohashi et al. | |
| 2003/0077013 A1* | 4/2003 | Zimmer | 384/415 |
| 2004/0140687 A1 | 7/2004 | Kalchschmidt et al. | 296/96.17 |
| 2005/0039290 A1 | 2/2005 | Morin et al. | 15/250.3 |
| 2006/0123580 A1 | 6/2006 | Kraus et al. | |
| 2006/0260085 A1* | 11/2006 | Kraus et al. | 15/250.31 |
| 2008/0201890 A1* | 8/2008 | Boos | 15/250.31 |
| 2008/0222828 A1 | 9/2008 | Barlas | |

FOREIGN PATENT DOCUMENTS

| | | |
|---|---|---|
| DE | 103 36 208 | 3/2005 |
| EP | 1 040 972 A2 | 10/2000 |
| FR | 0115886 | 12/2001 |
| GB | 2 347 340 A | 9/2000 |
| GB | 2 424 823 | 10/2006 |
| KR | 2003-0018373 A | 3/2003 |
| WO | WO 03/047926 | 6/2003 |
| WO | WO 2004/113134 | 12/2004 |

OTHER PUBLICATIONS

Jun. 15, 2011 International Search Report for PCT/US2010/051732.

(Continued)

*Primary Examiner* — Gary Graham

(57) ABSTRACT

A collapsible pivot body having a housing that includes a channel defined therein and a mounting bracket that is adapted to attach the pivot body to a portion of a vehicle. The collapsible pivot body further includes a sleeve operatively disposed within the channel. The sleeve includes an internal passage that is adapted to receive a pivot shaft assembly of a wiper system. The collapsible pivot body further includes a plurality of bridges that connect the sleeve to the housing. The bridges are adapted to fail in response to a predetermined load acting on a pivot shaft assembly and cause the sleeve to collapse within the housing, thereby displacing the pivot shaft assembly and a portion of a wiper arm below the impact line of a vehicle.

16 Claims, 3 Drawing Sheets

(56) References Cited

OTHER PUBLICATIONS

Fredriksson R., Haland Y., Yang J., Evaluation of a new pedestrian head injury protection system with a sensor in the bumper and lifting of the bonnet's rear edge, Paper No. 131, 17th International Conference on the Enhanced Safety of Vehicles (ESV), Jun. 2001, Amsterdam, Holland.

Apr. 4, 2008 "Patents Act 1977 Examination Report under Section 18(3)" for Application No. GB0606700.3.

Sep. 11, 2008 "Response to Apr. 4, 2008 Official Communication" for Application No. GB0606700.3.

Nov. 4, 2008 "Patents Act 1977 Examination Report under Section 18(3)" for Application No. GB0606700.3.

Jan. 6, 2009 "Response to Examination Report" for Application No. GB0606700.3.

Sep. 17, 2009 "Election/Restriction Requirement" for U.S. Appl. No. 11/397,049.

Sep. 28, 2009 "Response to Requirement for Election/Restriction" for U.S. Appl. No. 11/397,049.

Dec. 23, 2009 "Office Action" for U.S. Appl. No. 11/397,049.

* cited by examiner

US 8,516,647 B2

COLLAPSIBLE PIVOT BODY FOR A WINDSHIELD WIPER SYSTEM

BACKGROUND OF THE INVENTION

1. Field of the Invention

The present invention relates, generally, to windshield wiper systems. More specifically, the present invention relates to a collapsible pivot body for windshield wiper systems that displace a portion of the wiper system below the impact line of a vehicle upon receipt of a predetermined load.

2. Description of the Related Art

Windshield wiper systems commonly include a blade assembly that contacts the surface to be wiped, a wiper arm that supports the blade assembly as it moves across the surface to be wiped, and a linkage assembly having a pivot shaft assembly that interconnects the wiper arm assembly to a drive mechanism. The pivot shaft assembly transfers movement of the linkage assembly to the wiper arm. Due to its role in facilitating movement of the wiper arm, the pivot shaft assembly is operatively connected to several moving components of the linkage assembly and therefore complex to assemble and repair, if necessary. Furthermore, the pivot shaft assembly and the wiper arm are often operatively connected together at or above the impact line for a vehicle-pedestrian impact and therefore presents a risk of causing greater injury to pedestrians upon impact when compared to vehicle components located below the impact line.

As a result, there is a need in the art for a windshield wiper system having components that retreat below the impact line upon receipt of a predetermined load to reduce the risk of injury during vehicle-pedestrian impact. Furthermore, there is a need in the art for a wiper system having components that retreat below the impact line upon receipt of a predetermined load that is cost-effective and simple to repair.

SUMMARY OF THE INVENTION

The present invention overcomes many limitations and disadvantages in the related art in wiper systems for use in connection with an automotive vehicle. To this end, the wiper system of the present invention includes a collapsible pivot body having a housing that includes a channel defined therein and a mounting bracket that is adapted to attach the pivot body to a portion of a vehicle. The collapsible pivot body further includes a sleeve operatively disposed within the channel. The sleeve includes an internal passage that is adapted to receive a pivot shaft assembly of a wiper system. The collapsible pivot body further includes a plurality of bridges that connect the sleeve to the housing. The bridges are adapted to fail in response to a predetermined load acting on a pivot shaft assembly and cause the sleeve to collapse within the housing, thereby displacing the pivot shaft assembly and a portion of a wiper arm below the impact line of a vehicle.

The present invention is also directed toward a pivot shaft assembly for a windshield wiper system. The pivot shaft assembly of the present invention includes the above-described collapsible pivot body and further includes a pivot shaft that is adapted to direct a wiper arm in an oscillating manner across a windshield. The pivot shaft includes a base mounted to a portion of a wiper system's linkage assembly. The pivot shaft further includes a column that extends from the base and is received within the internal passage of the sleeve of the pivot body. The column is able to rotate within the internal passage, relative to the sleeve, to facilitate the oscillating movement of a wiper arm across a windshield. The pivot shaft further includes a pivot head that extends from the column and is adapted to engage a portion of the wiper arm. In response to a predetermined load acting on the pivot shaft, the bridges of the pivot body will fail and cause the sleeve to collapse within the housing, thereby displacing the pivot shaft assembly and a portion of a wiper arm below the impact line of a vehicle.

Thus, one advantage of the present invention is that the collapsible pivot body displaces wiper system components below the impact line of a vehicle upon receipt of a predetermined load.

Another advantage of the present invention is that the collapsible pivot body enables the wiper arm to move below the impact line while at the same time allows additional components of the wiper system to remain intact.

Still another advantage of the present invention is that it provides a collapsible pivot body that reduces costs associated with replacing of this component of the wiper system following the receipt of a predetermined load such as a load resulting from pedestrian impact.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
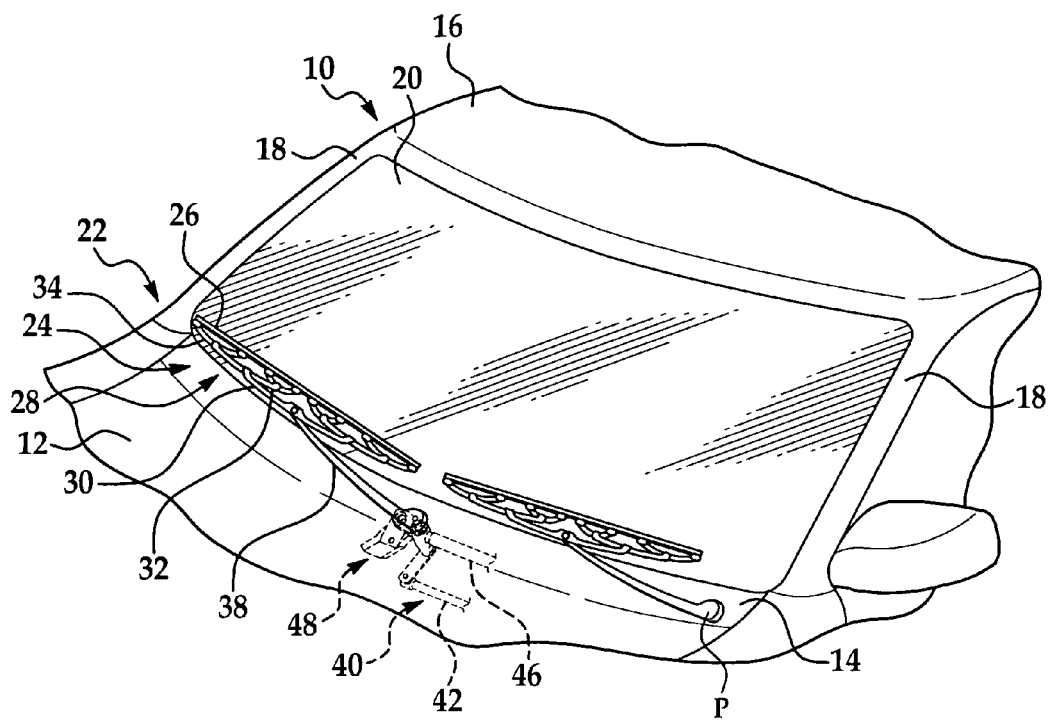
FIG. 1 is a partial perspective view of the front of an automotive vehicle having a windshield wiper system for reciprocal movement across the windshield of the vehicle.

Referring now to the Figures, where like numerals are used to designate like structure, a portion of an automotive body is illustrated at 10 in FIG. 1. The vehicle body 10 includes a hood 12, engine plenum 14, a roof 16 and a pair of laterally spaced front or "A" pillars 18 extending between the roof 16 and the plenum 14. The A-pillars 18, roof 16 and engine plenum 14 cooperate to define a generally rectangular opening in which is supported a curved or "swept back" glass windshield 20.

A windshield wiper system is generally indicated at 22 in FIG. 1 and is employed to clean the glass windshield 20. The system 22 includes at least one wiper assembly, generally indicated at 24. As shown in FIG. 1, the system 22 includes two blade assemblies 24, which correspond to the driver and passenger side of the vehicle 10. The structure of the blade assemblies 24 shown in FIG. 1 is identical. Accordingly, the structure of both blade assemblies 24 may be understood with reference to only one blade assembly 24. However, those having ordinary skill will appreciate that windshield wiper systems 22 may include any number of blade assemblies 24 or blade assemblies 24 of different lengths without departing from the scope of the present invention. Furthermore, while the present invention is described with respect to a windshield wiper system 22, those having ordinary skill in the art will appreciate that the present invention may be employed within other wiper systems. By way of example, the present invention may be employed within wiper systems for headlamps or rear windows.

As shown in FIG. 1, the blade assembly 24 includes an elongated wiping element 26 operable for wiping action against the windshield 20 and a "tournament" style superstructure generally indicated at 28. The superstructure 28 includes a primary lever 30, two secondary levers 32, and a series of two or more tertiary levers 34. The wiping element 26 is mounted to the superstructure 28 through claws 36 formed on the opposed distal ends of the tertiary levers 34. The tertiary levers 34 are each articulated to a secondary lever 32 at pivot points located at the opposed lateral ends of the secondary levers 32. Similarly, the secondary levers 32 are articulated to the primary lever 30 at pivot points located at the opposed, lateral ends of the primary lever 30. Those having ordinary skill in the art will appreciate that while the blade assembly 24 is shown having a tournament style superstructure 28, different superstructures may be employed without departing from the scope of the invention. By way of example, the blade assembly may include a beam-blade style superstructure rather than the tournament-style as shown without departing from the scope of the present invention.

The windshield wiper system 22 further includes a wiper arm 38 having one end operatively attached a corresponding blade assembly 24 and another end pivotally mounted to a linkage assembly, as will be described in greater detail below. The wiper arm 38 is adapted to facilitate the oscillating movement of the blade assembly 24 across the windshield 20 and may include a biasing member (not shown) such as a spring, which creates a force that is distributed to the wiper element 26 through the superstructure 28 to clean the windshield 20. The remaining components of the wiper system 22 are not visible from the exterior of the vehicle 10. Rather, the remaining components are generally located within the engine compartment and concealed by the engine plenum 14, hood 12, or other portions of the vehicle body 10.

Figure 2:
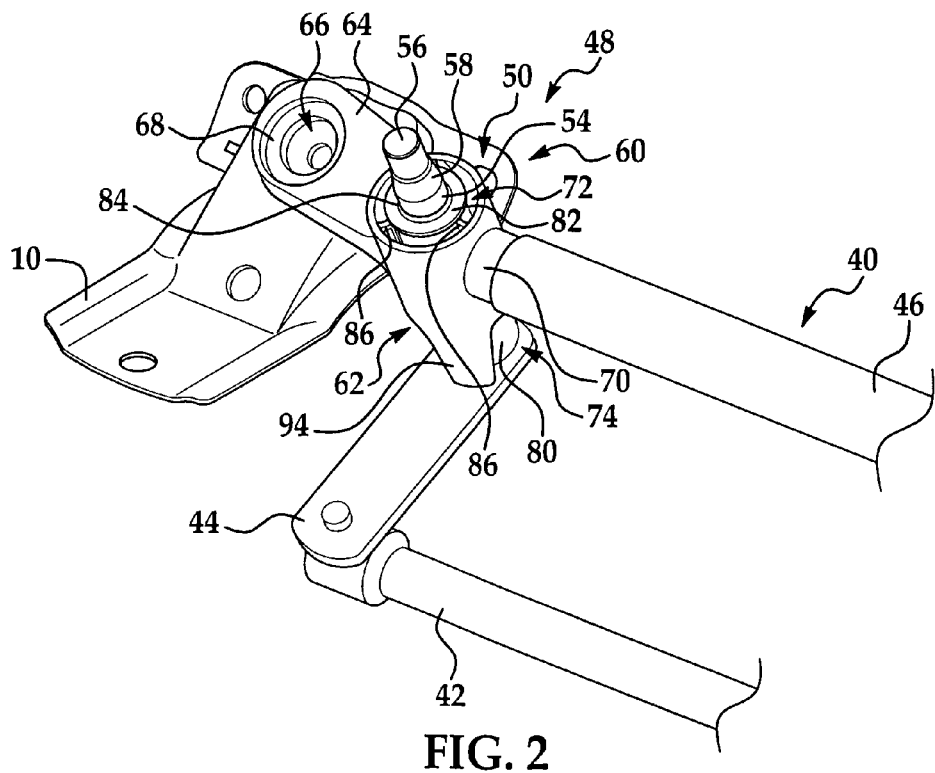
FIG. 2 is top perspective view of the pivot shaft assembly having a collapsible pivot body in accordance with the present invention that is attached to a portion of the vehicle and connected to the linkage assembly of a wiper system.

Referring to FIGS. 1 and 2, the wiper system 22 further includes a linkage assembly, generally indicated at 40. The linkage assembly 40 is interposed between a wiper motor (not shown) and the wiper arms 38 for translating rotational movement of the motor into pivotal movement of the wiper arm 38 across the windshield 20. The linkage assembly 40 includes a drive arm 42 operatively attached to a wiper motor (not shown) at one end and a pivot lever 44 at the other end. Those having ordinary skill in the art will appreciate that a windshield wiper system may include one wiper motor to drive multiple wiper arms or separate wiper motors for each wiper arm 38 (i.e. a direct drive system). Where a single wiper motor is employed for multiple wiper arms 38, the linkage assembly 40 may further include a unitizing tube 46 to facilitate operational movement of multiple wiper arms 38 across a windshield 20 in a synchronized manner. Those having ordinary skill in the art will appreciate that the linkage assembly 40 may take any number of different configurations or may be substantially eliminated in favor of a direct drive system for each wiper arm 38 without departing from the scope of the present invention.

Figure 4A:
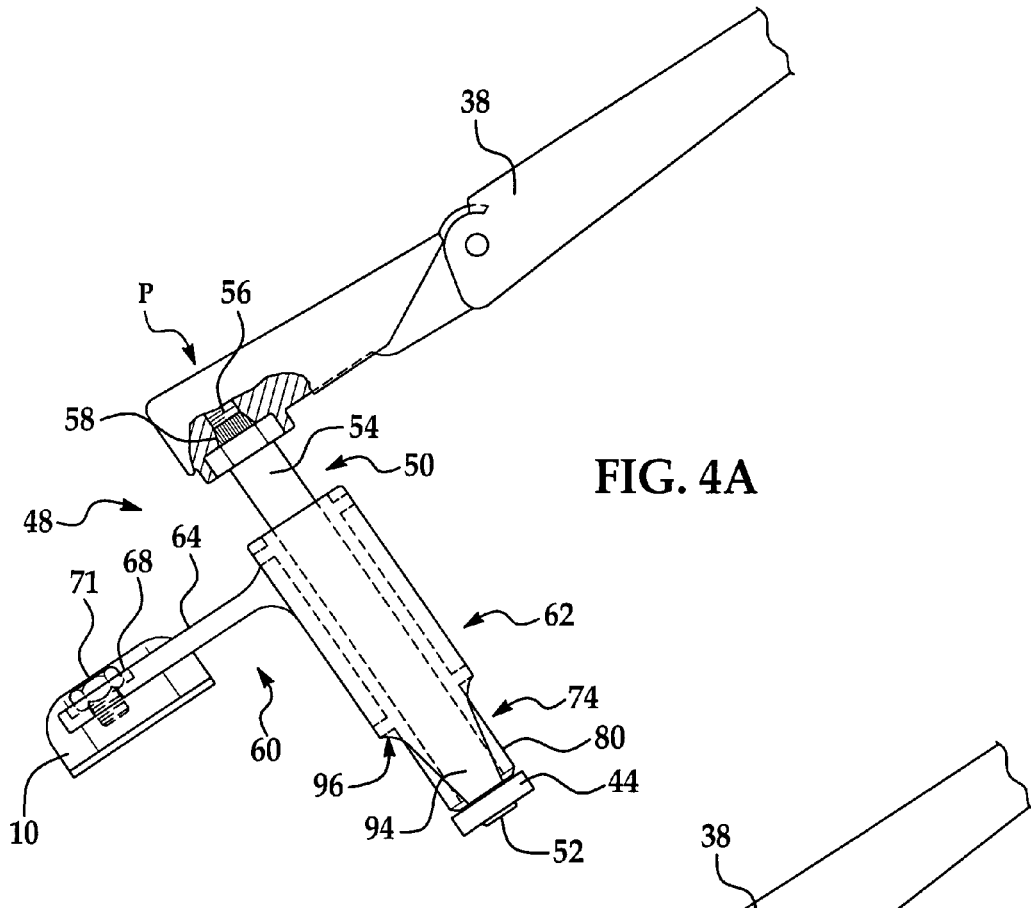
FIG. 4A is a side view of the pivot shaft assembly having a collapsible pivot body in accordance with the present invention and attached to a wiper arm and portion of the vehicle.
Figure 4B:
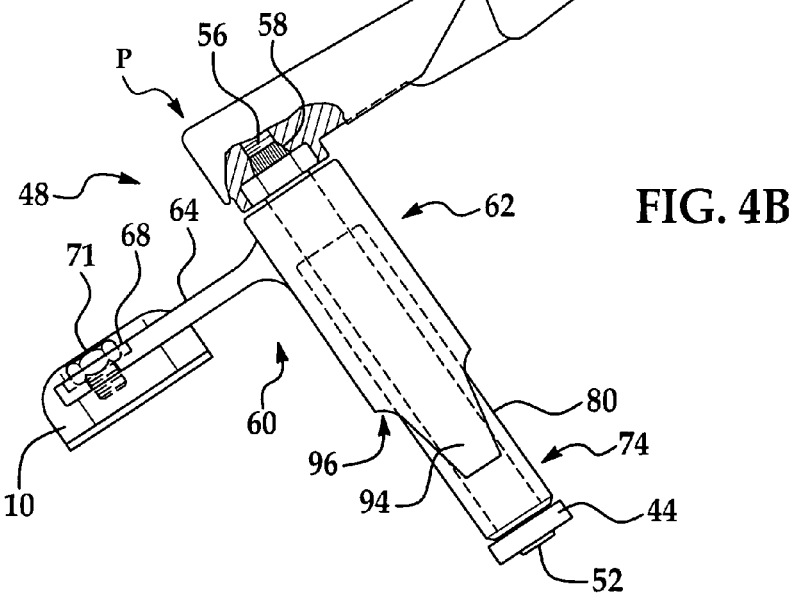
FIG. 4B is a side view of the pivot shaft assembly having a collapsible pivot body in accordance with the present invention and attached to a wiper arm and portion of the vehicle wherein the pivot body has collapsed in response to a predetermined load acting on the pivot shaft assembly.

Referring specifically to FIGS. 2, 4A and 4*b*, the wiper system 22 further includes at least one pivot shaft assembly, generally indicated at 48. The pivot shaft assembly 48 is adapted to operatively receive one end of the wiper arm 38 at a point of attachment (P). Accordingly, the number of pivot shaft assemblies 48 corresponds to the number of wiper arms 38 employed in the wiper system 22. The pivot shaft assembly 48 includes a pivot shaft, generally indicated at 50. The pivot shaft 50 includes a base 52 that is mounted to the pivot lever 44 and column 54 that extends from the base 52. The pivot shaft 50 further includes a pivot head 56 that is adapted to engage a portion of the wiper arm 38 and a flanged portion 58 disposed between the pivot head 56 and the column 54. The flanged portion 58 is adapted to facilitate proper seating of the pivot shaft 50 relative to a collapsible pivot body, as will be discussed in greater detail below.

Referring to FIGS. 2-4A, the pivot shaft assembly 48 further includes a collapsible pivot body, generally indicated at 60. The collapsible pivot body 60 includes a housing, generally indicated at 62. The housing includes a mounting bracket 64 that is adapted to attach the pivot body 60 to a portion of a vehicle body 10. The mounting bracket 64 extends outwardly from the housing 62 and includes an aperture 66 and a recessed section 68 that is disposed around the aperture 66. The aperture 66 is adapted to receive a fastening member 71, such as a bolt, a screw, pin or any other suitable fastening member to attach the pivot body 60 to the vehicle body 10 in an over-mount manner. The recessed section 68 is adapted to facilitate attachment of the pivot body 60 to the vehicle body 10 in the over-mount manner such that the fastening member 71 may be counter-sunk. Additionally, the recessed section 68 provides an area that may be adapted to receive a dampening material to reduce the noise, vibration and harshness (NVH) transferred between the pivot shaft assembly 48 and the vehicle body 10.

The housing further includes an attachment member 70 that extends outwardly from the housing 62. The attachment member 70 is adapted to operatively engage a portion of the windshield wiper system. As shown in FIG. 2, the attachment member 70 is operatively engage to the unitizing tube 46 of the linkage assembly 40. More specifically, a portion of the attachment member 70 is received within the unitizing tube 46. However, those having ordinary skill in the art will appreciate that the operative attachment between the unitizing tube 46 and the attachment member 70 may be accomplished by other means. By way of example, the attachment member 70 and the unitizing tube 46 may be linked together by a pin or cantilevered tabs. Additionally, those having ordinary skill in the art will appreciate that the housing 62 may not include an attachment member 70 where the windshield wiper system 20 utilizes a direct drive motor for each wiper arm 38. Furthermore, those having ordinary skill in the art will appreciate that the mounting bracket 64 and attachment member 70 are integrated within the housing 62. To this end, the housing 62 may be constructed from a plastic or a polymer and may be formed by an injection molding or casting process that simultaneously forms the mounting bracket 64 and the attachment member 70. Alternatively, the housing 62, mounting bracket 64 and attachment member 70 may be manufactured separately and from different materials and subsequently assembled.

Figure 3A:
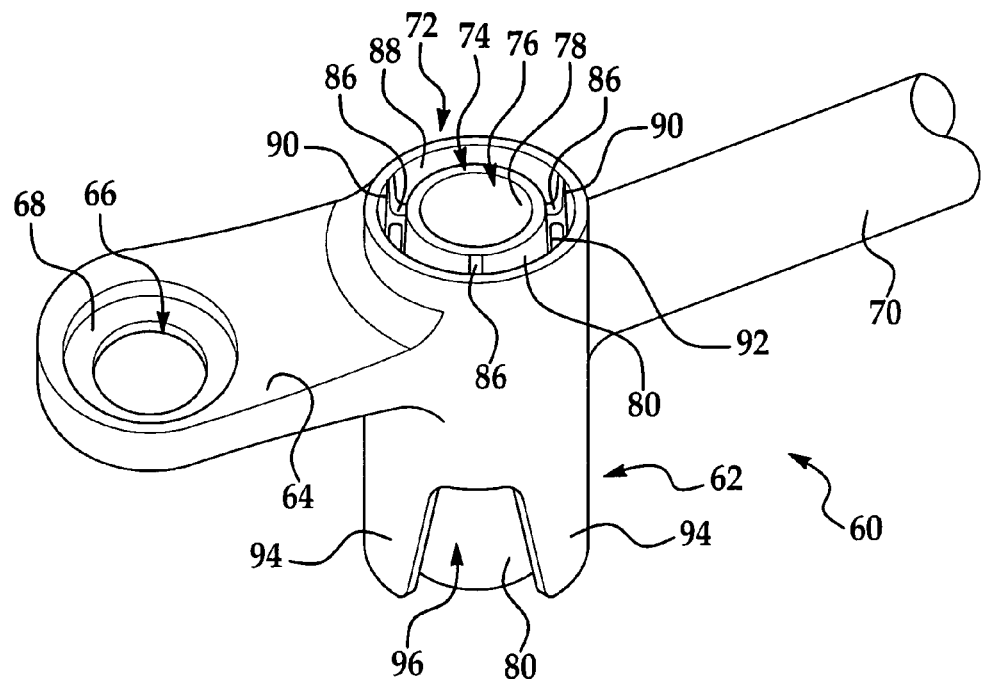
FIG. 3A is a top perspective view of the collapsible pivot body in accordance with the present invention.
Figure 3B:
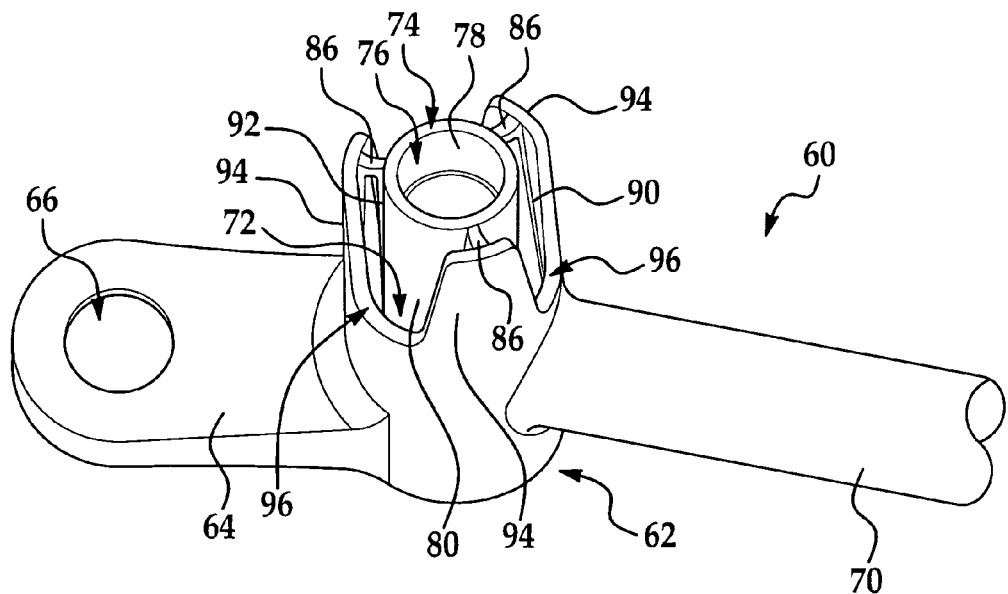
FIG. 3B is a bottom perspective view of the collapsible pivot body in accordance with the present invention.

Referring specifically to FIGS. 3A and 3B, the housing 62 further includes a channel 72 defined therein and a sleeve 74 that is operatively disposed within the channel 72. The sleeve 74 includes an internal passage 76 that is adapted to receive the pivot shaft 50. The sleeve 74 includes an inward surface 78 that faces the pivot shaft 50 of the pivot shaft assembly 48 and an outward surface 80. More specifically, the pivot shaft 50 is adapted to rotate within the internal passage 76 of the sleeve 74, thereby moving the wiper arm 38 in an oscillating manner. As is commonly known in the art, the pivot shaft 50 rotates within a field of lubricant, such as grease, that is packed within the internal passage 76 of the sleeve 74 to reduce friction between the pivot shaft 48 and inward surface 78 during rotational operation.

To this end and as best shown in FIG. 2, the pivot shaft assembly 42 further includes a dampening member 82 and a retaining member 84 that are disposed between the sleeve 74 and the flanged area 58 of the pivot shaft 50. The dampening member 82 and the retaining member 84 cooperate to retain the lubricant within the internal passage 76 as well as reduce the transfer of NVH to or from the wiper arm 38 that may result from during operational movement across the windshield 20. Those having ordinary skill in the art will appreciate that a dampening member 82 may be made from any material that will reduce the transfer of NVH at this location. By way of example, a dampening member 82 may include a polymer washer, a nylon disk, silicone bushing or the like. Additionally, those having ordinary skill in the art will appreciate that the retaining member 84 may include any component that is capable of retaining a dampening member 82 in a predetermined location. By way of example, the retaining member 84 may be a compression ring, nut or an elastomeric band.

As illustrated in FIGS. 2 and 4A, the pivot shaft assembly 48 is assembled and mounted to the vehicle body 10 in an over-mount manner to provide efficient installation to the vehicle and connection to the linkage assembly 40. However, in order to attach the wiper arm 38 to the pivot shaft assembly 48, the head 56 of the pivot shaft 50 is visible from the exterior of the vehicle 10. As a result, a portion of the wiper arm 38 and pivot shaft assembly 48 and more particularly, the point of attachment (P) therebetween, may be contacted by a pedestrian in the event of an impact with a vehicle. Accordingly, the collapsible pivot body 60 of the present invention further includes a plurality of bridges 86 that connect the sleeve 74 to the housing 62 and are adapted to break in response to a predetermined load acting on the pivot shaft 50, thereby displacing a portion of the pivot shaft assembly 48 and wiper arm 38 below the impact line of a vehicle (FIG. 4B).

Referring specifically to FIGS. 3A and 3B, the bridges 86 are attached to the outward surface 80 of the sleeve 74 and extend radially outward therefrom. The channel 72 includes a channel surface 88 and the bridges 86 integrally connect the channel surface 88 to the outward surface 80 of the sleeve 74. Furthermore, the channel surface 88 includes support beams 90 and the outward surface 80 includes ribs 92 that cooperate to support the bridges 86 and prevent the sleeve 74 from prematurely collapsing within the channel 72. As illustrated in FIGS. 4A and 4B, in the event of a predetermined load acting on the pivot shaft assembly 48 (such as that incurred during a vehicle-pedestrian impact), the bridges 86 are adapted to fail, thus interrupting the connection between the sleeve 74 and the housing 62. More specifically, in one embodiment, the sleeve 74 will collapse within the channel 72, thereby displacing the pivot shaft assembly 48 below the impact line of a vehicle 10. Those having ordinary skill in the art will appreciate that the amount of load required for the bridges 86 to fail will vary from application to application. Accordingly, the dimensions, type of material, and number of bridges 86 will vary to accommodate the intended application.

As illustrated in FIGS. 3A and 3B, one embodiment of the collapsible pivot shaft assembly 48 of the present invention includes six bridges 86 operatively connecting the sleeve 74 to the channel surface 88 of the housing 62. Particularly, FIGS. 3A, 3B and 4A illustrate the bridges 86 oriented in a stacked pair configuration. Additionally, the pivot body 60 further includes a plurality of tabs 94 that depend from the housing 62 and a plurality of reliefs 96 disposed adjacent to the tabs 94. The tabs 94 are adapted to provide additional support to the pivot shaft assembly 48. Moreover, the tabs 94 and the reliefs 96 cooperate to facilitate the displacement of the pivot shaft assembly 48 when the sleeve 74 collapses within the channel 72 in response to a predetermined load. More specifically, the tabs 94 guide the sleeve 74 in a particularly linear downward direction as it collapses within the sleeve 74 while the reliefs 96 provide the sleeve 74 with a limited amount of lateral movement during displacement in response to a predetermined load acting on the pivot shaft assembly 48. Enabling the sleeve 74 limited lateral movement can reduce the likelihood of damage to other components of the wiper system 22 during displacement, such as the pivot lever 44 or drive arm 42.

By employing a collapsible pivot body 60 within a pivot shaft assembly 48 of a wiper system 22, certain components of the wiper system 22 are displaced below the impact line of a vehicle 10, while the linkage assembly remains intact. As a result, the collapsible pivot body 60 of the present invention helps to eliminate or reduce costly repairs associated with re-assembling the wiper system 22 linkage assemblies 40. Furthermore, since the collapsible pivot body 60 employs a mounting bracket 64 that provides an over-mount manner of attaching to a vehicle 10, the present invention provides efficient assembly and mounting during new vehicle production as well as during a repair.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A collapsible pivot body for a windshield wiper system comprising:
   a housing having a channel defined therein and a mounting bracket that is adapted to attach a pivot body assembly to a portion of a vehicle;
   a sleeve operatively disposed within said channel and having an internal passage that is adapted to receive a pivot shaft of a wiper system; and
   a first plurality of bridges that connect said sleeve to said housing, said bridges are adapted to fail in response to a predetermined load acting on a pivot shaft assembly and cause said sleeve to collapse within said housing thereby displacing the pivot shaft assembly and a portion of a wiper arm below the impact line of a vehicle;
   said pivot body including a plurality of tabs depending from said housing and a plurality of reliefs, with each one of said tabs disposed adjacent to a corresponding relief, said tabs and adjacent reliefs alternatingly disposed radially about said housing, spaced from said sleeve and below said first plurality of bridges, said tabs and reliefs cooperating to guide said sleeve and provide limited lateral movement thereof when said sleeve is collapsed within said channel in response to a predetermined load acting on a pivot shaft assembly.

2. The collapsible pivot body as set forth in claim 1 wherein said housing further includes an attachment member extending outwardly therefrom to operatively engage the linkage assembly of a wiper system.

3. The collapsible pivot body as set forth in claim 1 wherein said sleeve further includes an inward surface that engages a pivot shaft assembly and an outward surface that engages said bridges.

4. The collapsible pivot body as set forth in claim 3 wherein said outward surface further includes ribs that are adapted to provide support to said bridges at the point of contact with said outward surface.

5. The collapsible pivot body as set forth in claim 1 wherein said housing further includes a channel surface within said channel to engage said bridges, said channel surface having support beams that are adapted to support said bridges at the point of contact with said channel surface.

6. The collapsible pivot body as set forth in claim 1 wherein said mounting bracket extends outwardly from said housing and includes at least one aperture defined therein and a recessed section disposed around said aperture that cooperates with said aperture to facilitate attachment to a portion of a vehicle in an over-mount manner.

7. The collapsible pivot body as set forth in claim 1 further including a second plurality of bridges, wherein said first and second pluralities of bridges include six bridges that are operatively disposed between said housing and said sleeve in a stacked pair configuration.

8. A pivot shaft assembly for a wiper system including a collapsible pivot body, said pivot shaft assembly comprising:
a pivot shaft adapted to direct a wiper arm in an oscillating manner across a windshield, said pivot shaft having a base mounted to a portion of a wiper system linkage assembly, a column that extends from said base and a pivot head that extends from said column and is adapted to engage a portion of the wiper arm; and
pivot body that is operatively connected to said pivot shaft, including a housing having a channel defined therein and a mounting bracket to attach said pivot body to a portion of the vehicle, said pivot body further including a sleeve operatively disposed within said channel, said sleeve having an internal passage that is adapted receive said pivot shaft and facilitate rotational movement of said column relative to said sleeve,
wherein said pivot body further includes a first plurality of bridges that connect said sleeve to said housing and are adapted to fail in response to a predetermined load acting on said pivot shaft and cause said sleeve to collapse within said housing thereby displacing said pivot shaft and a portion of a wiper arm below the impact line of a vehicle;
said pivot body including a plurality of tabs depending from said housing and a plurality of reliefs, with each one of said tabs disposed adjacent to a corresponding relief, said tabs and adjacent reliefs alternatingly disposed radially about said housing, spaced from said sleeve and below said first plurality of bridges, said tabs and reliefs cooperating to guide said sleeve and provide limited lateral movement thereof when said sleeve is collapsed within said channel in response to a predetermined load acting on a pivot shaft assembly.

9. The pivot shaft assembly as set forth in claim 8 wherein said pivot shaft further includes a flanged portion disposed between said pivot head and said column that is adapted to facilitate proper seating of said pivot shaft within said sleeve.

10. The pivot shaft assembly as set forth in claim 8 further includes a retaining member that operatively engages said pivot shaft to retain said column within said sleeve and a dampening member that is disposed adjacent to said retaining member to facilitate retention of said column within said sleeve and dampen noise, vibration and harshness between said pivot shaft and said pivot body.

11. The pivot shaft assembly as set forth in claim 8 wherein said sleeve further includes an inward surface that is disposed adjacent to said column and an outward surface that engages said bridges.

12. The pivot shaft assembly as set forth in claim 11 wherein said outward surface further includes ribs that are adapted to provide support to said bridges at the point of contact with said outward surface.

13. The pivot shaft assembly as set forth in claim 8 wherein said housing further includes a channel surface within said channel to engage said bridges, said channel surface having support beams that are adapted support said bridges at the point of contact with said channel surface.

14. The pivot shaft assembly as set forth in claim 8 further including a second plurality of bridges, wherein said first and second pluralities of bridges include six bridges that are operatively disposed between said housing and said sleeve in a stacked pair configuration.

15. A wiper system including a collapsible pivot body, said wiper system comprising:
a wiper arm that is adapted to facilitate movement of a windshield wiper assembly across a surface to be wiped, said wiper arm having one end that is adapted to be operatively attached to a windshield wiper assembly; and
a pivot shaft assembly that is operatively connected to said wiper arm, said pivot shaft assembly having a pivot shaft that is adapted to direct said wiper arm in an oscillating manner across a windshield, said pivot shaft having a base mounted to a portion of a wiper system linkage assembly, a column that extends from said base and a pivot head that extends from said column and is adapted to engage a portion of the wiper arm, said pivot shaft assembly further having a pivot body that is operatively connected to said pivot shaft, said pivot body includes a housing having a channel defined therein and a mounting bracket to attach said pivot body to a portion of the vehicle, said pivot body further includes a sleeve operatively disposed within said channel, said sleeve having an internal passage that is adapted to receive said pivot shaft and facilitate rotational movement of said column relative to said sleeve,
wherein said pivot body further includes a plurality of bridges that connect said sleeve to said housing and are adapted to fail in response to a predetermined load acting on said pivot shaft and cause said sleeve to collapse within said housing thereby displacing said pivot shaft and a portion of a wiper arm below the impact line of a vehicle;
said pivot body including a plurality of tabs depending from said housing and a plurality of reliefs, with each one of said tabs disposed adjacent to a corresponding relief, said tabs and adjacent reliefs alternatingly disposed radially about said housing, spaced from said sleeve and below said bridges, said tabs and reliefs cooperating to guide said sleeve and provide limited lateral movement thereof when said sleeve is collapsed within said channel in response to a predetermined load acting on a pivot shaft assembly.

16. The wiper system as set forth in claim 15 wherein said pivot shaft assembly further includes an outward surface disposed on said sleeve and a channel surface disposed on said channel, said outward surface having ribs and said channel surface having beams that cooperate to support said bridges at the point of contact with said outward surface and said channel surface.

* * * * *

UNITED STATES PATENT AND TRADEMARK OFFICE
CERTIFICATE OF CORRECTION

PATENT NO. : 8,516,647 B2  
APPLICATION NO. : 12/587858  
DATED : August 27, 2013  
INVENTOR(S) : O'Connor Page 1 of 1

It is certified that error appears in the above-identified patent and that said Letters Patent is hereby corrected as shown below:

In the Claims

Column 7, Claim 8, line 36 insert --to-- between "adapted" and "receive".

Signed and Sealed this  
Tenth Day of December, 2013

Margaret A. Focarino  
*Commissioner for Patents of the United States Patent and Trademark Office*